(12) United States Patent
Johnson

(10) Patent No.: US 6,310,576 B1
(45) Date of Patent: Oct. 30, 2001

(54) METHOD OF IDENTIFYING LOCATION USING A MASTER CLOCK TO SYNCHRONIZE TIME OF ARRIVAL SIGNALS

(75) Inventor: Mark J. Johnson, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/465,572

(22) Filed: Dec. 17, 1999

Related U.S. Application Data

(60) Provisional application No. 60/114,130, filed on Dec. 30, 1998.

(51) Int. Cl.[7] ................................. G01S 3/02; H04Q 7/20
(52) U.S. Cl. ......................... 342/465; 342/457; 342/463; 455/456
(58) Field of Search .................................... 342/387, 463, 342/464, 465, 450, 457; 455/456, 457

(56) References Cited

U.S. PATENT DOCUMENTS 5,719,584   2/1998   Otto .
5,815,538   9/1998   Grell et al. .

OTHER PUBLICATIONS

"Loran–C User Handbook" U.S. Department of Transportation and United States Coast Guard: 1992 COMDTPUB P16562.6, pp. II–1 to II–7.

Primary Examiner—Thomas H. Tarcza
Assistant Examiner—Fred H. Mull
(74) Attorney, Agent, or Firm—Susan L. Lukasik; Terri S. Hughes

(57) ABSTRACT

A method is provided of identifying position location of a transmitter device, such as a mobile or portable, in an inbound system. The inbound system includes free receivers all coupled, over appropriate radio frequency (RF) links, to a common reference receiver, the latter equipped with a high precision timebase master clock for receiver synchronization purposes. Rather than requiring each and every receiver to maintain a separate high-precision timebase to record position related timing signals for position location determination, in accordance with a preferred embodiment, the free receivers are configured to detect timing signals from the transmitter device, and without timestamping them, quickly forward them (in the form of a signal-received indication) after a fixed or otherwise known time delay to the reference receiver. The reference receiver, in turn, timestamps all signals from all free receivers according to its own master clock high precision timebase. In this way, it is possible to synchronize the forwarded signal-received indications to the reference receiver master clock and to use the results to derive useful position location information. This is achieved without equipping high precision timebase clocks in the free receivers, which in most instances is prohibitively expensive.

20 Claims, 4 Drawing Sheets

METHOD OF IDENTIFYING LOCATION USING A MASTER CLOCK TO SYNCHRONIZE TIME OF ARRIVAL SIGNALS

The present application is based on prior U.S. application Ser. No. 60/114,130, filed on Dec. 30 1998, which is hereby incorporated by reference, and priority thereto for common subject matter is hereby claimed.

FIELD OF THE INVENTION

The present invention relates generally location systems, and particularly to RTOA (relative time-of-arrival) based systems.

BACKGROUND OF THE INVENTION

RTOA based systems typically attempt to locate a certain device based on the time taken for signals to propagate between that certain device and base stations in communication therewith whose locations are known. This is made possible by the fact that signal travel time is directly related to the distance traveled by the signal.

Some systems, such as GPS and LORAN-C, are "outbound," meaning that the signal is emitted by the base stations and received by the portable or mobile unit which calculates its location. Other systems are "inbound," meaning that the signal is transmitted by the mobile unit and picked up by the receivers, which typically report the arrival time to a central unit where the location calculation is performed. With a strictly inbound or outbound signal, the travel time is not known; the only known value is the difference in travel times between a given device (e.g., a mobile radio unit) and a plurality of base stations.

RTOA systems typically employ either hyperbolic triangulation or trilateration. In trilateration, such as employed in GPS, the position of an unknown point is determined by measuring the lengths of the sides of a triangle between the unknown point (e.g., a mobile unit) and two or more known points (i.e., satellites). For triangulation type position determinations, a position is determined by taking angular bearings from two points a known distance apart and computing the unknown point's position from the resultant triangle. In RTOA systems, because a specific distance difference between a certain target (receiver) device and two fixed points in a plane (i.e., satellites (GPS) or ground based stations (LORAN-C)) define a hyperbola, relative position information by and of the target can be readily determined. As is well known and understood, the intersection of two or more hyperbolae defines the geometric positional location of the target device. Thus, by making available additional satellites (or ground based stations) a more accurate position can be calculated than with fewer satellites. Generally, it is possible to determine three-dimensional position in GPS using a maximum of only four satellites.

Referring to a GPS system as an exemplary RTOA system, satellites are selectively employed which transmit a coded radio signal that is unique to each satellite. Mobile units on the ground passively receive each visible satellite's radio signal and measure the time it takes for the signal to travel from the source (satellite) to the target (the receiver itself). In its most simplistic form, determining distance is a simple matter of computing distance by multiplying the time in transit of the coded radio signal by the velocity of transit. In an RF environment, since radio waves travel at the speed of light, which is essentially fixed at 300,000 km/sec., the velocity is known. The only thing needed by the receiver to calculate distance from any given satellite is a measurement of the time it took for a coded radio signal to reach it from the satellite.

The critical feature, therefore, in RTOA systems is that appropriate clocking means be provided such that the arrival time of transmitted signals can be recorded/determined with extreme precision. To acquire an accurate position it is crucial that very precise time measurements can be made. In GPS, it turns out that it only takes about $\frac{1}{15}$ of a second for a satellite signal from orbit to reach a receiver on the ground. Doing the math, an error of one nanosecond in an RF system translates into a location error of approximately a foot. The arrival of signals at different receivers for inbound systems (or the transmission of a signal in outbound systems) must be known relatively within the system resolution, typically 10–300 ns for an RF system. Any error attributed to synchronization translates into additional location error.

Most prior art systems, such as GPS and LORAN-C, circumvent this problem with an outbound architecture. LORAN-C systems synchronize constantly from a master clock, and GPS systems are provided with satellite-carried atomic clock timebases. Atomic clocks are the choice time source as they accurate to within billionths of a second per month. However, besides weighing hundreds of kilograms each, each clock costs in the hundreds of thousands of dollars. While cost and weight may be acceptable for outbound systems where a limited number of such clocks may be required (i.e., in only each of a limited number of available satellite (GPS) or ground based stations (LORAN-C) transmitting coded radio signals to for example ground-based receivers), it is not practical to employ expensive clock sources, such as atomic clocks in lower-powered systems where the number of receivers (base stations) is much higher.

A ground-based inbound system 100 employing conventional time-of-arrival position location measurements, is depicted in FIG. 1. In the exemplary system 100, there is included a plurality of base station receivers 121, 122, 123, and 124 coupled to receive a signal broadcast from a transmitter 130, which signals travels over direct paths 141, 142, 143, and 144 to each of the base station receivers 121–124, respectively. The transmitter 130 may be a cellular phone, pager or the like portable device, or could be an agricultural crop row monitor, or even a non-terrestrial object, so long as provided with means to transmit a signal detectable by the base station receivers 121–124. It should be likewise appreciated that the base stations could be ground-based, as shown in the figure, or nonground based (e.g., satellites) type devices, or a combination of both ground and non-ground based devices, and are capable of both signal transmission as well as signal reception. For ease of comprehension, the transmitter 130, while it may typically be employed as a receiver device (e.g., a cellular phone), in the context of an inbound position location RTOA system such as shown in FIG. 1, it is given the label of "transmitter" since for the purpose of having its position identified by the system it must necessarily function as a transmitting device. Likewise, the base station receivers 121–124, while typically functioning as transmitter devices, sending voice and/or data signals to mobile units such as transmitter 130, are characterized as receivers, since in the context of an inbound system, function as receivers of the signal transmitted by the transmitter 130 over the associated link 141–144.

Referring back to FIG. 1, each base station receiver 121–124 reads its own independently-running clock 146–149 when the signal is received over direct paths 141–144, respectively, timestamps the time the signal was received and reports the time of arrival timestamp of the signal over a separate link (via, for example, a corresponding wireline modem link 151, 152, 153, and 154) to a navigation console 181. The navigation console 181 computes the differences in the arrival times and uses them to calculate a location of the transmitter 130. In the illustrative embodiment of FIG. 1, it is assumed that each base station clock 146–149 is an atomic clock or the like high precision timebase source so as to independently report very precise, high-accuracy time-of-arrival signals to the console 181.

The use of plural high accuracy clocks inherently significantly impacts the cost of system implementation in the typical inbound system as depicted in FIG. 1.

Certain inbound systems address the problem of atomic clock deployment at each and every critical receiver, by substituting where practically possible, oven-controlled oscillators, and by frequently synchronizing transmissions from a reference device, thus tracking offset and drift from a central location, or a combination of both. However, oven-controlled oscillators of the caliber required for very precise time broadcast also have a severe cost impact, and are subject to drastic environmental restrictions. For example, it is not unusual that in order to maintain proper oscillator operation (accurate timing), many such oven-controller oscillators require that they be placed in a very expensive climate-controlled environment.

Lastly, even where very precise time sources are provided in an inbound type system, unaccounted clock drift that may occur between synchronization transmissions, adding to the overall system error, needs to be accounted for. Accordingly, synchronization transmissions consume bandwidth and power without adding any value to the system.

Thus, although the timebase requirements raise cost, reliability, and often times environmental issues, the approach of refining the existing solution rather than seeking a new solution has been the preferred choice. The timebase issue is generally seen as "solved" even if the solution is less than perfect, by a solution that requires the system developer to first specify the desired accuracy and otherwise accept the cost penalty for achieving that accuracy.

It would therefore be a great advancement in the art to be able to report useful time of arrival signals of a signal broadcast from a transmitter to plural remote receivers for use by a central station without having to employ independently running high-precision clocks at each receiver.

DETAILED DESCRIPTION OF A PREFERRED EMBODIMENT

Generally, the present invention involves an improved and less costly method of identifying position location of a transmitter device, such as a mobile or portable, in an inbound system. The inbound system includes free receivers all coupled, over appropriate radio frequency (RF) links, to a common reference receiver, the latter equipped with a high precision timebase master clock for receiver synchronization purposes. Rather than requiring each and every receiver to maintain a separate high-precision timebase to record position related timing signals for position location determination, in accordance with a preferred embodiment, the free receivers are configured to detect timing signals from the transmitter device, and without timestamping them, quickly forward them (in the form of a signal-received indication) after a fixed or otherwise known time delay to the reference receiver. The reference receiver, in turn, timestamps all signals from all free receivers according to its own master clock high precision timebase. In this way, it is possible to synchronize the forwarded signal-received indications to the reference receiver master clock and to use the results to derive useful position location information. This is achieved without equipping high precision timebase clocks in the free receivers, which in most instances is prohibitively expensive.

The present invention will now be described in greater detail with reference to FIG. 2 through FIG. 5.

Figure 2:
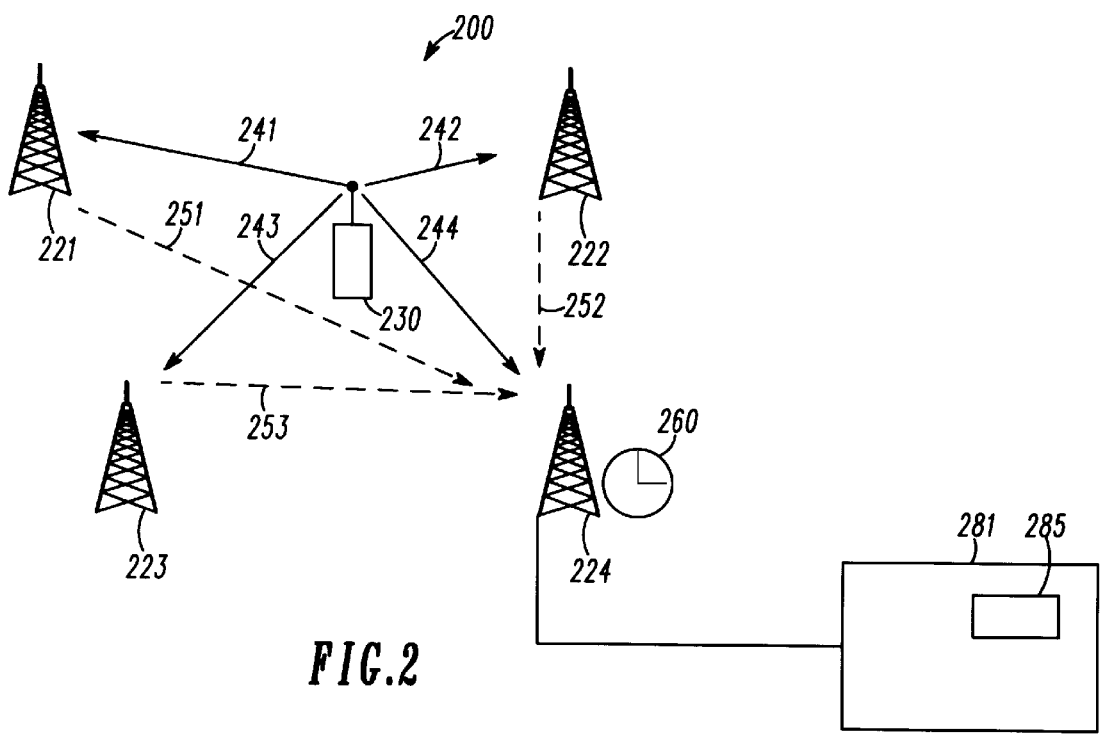
FIG. 2 illustrates an exemplary, ground-based inbound RTOA system, having receivers configured for processing and reporting time-of-arrival signals in accordance with a first embodiment of the present invention.

Referring to FIG. 2, there is shown an inbound relative time-of-arrival (RTOA) based system 200 configured in accordance with a first preferred embodiment of the present invention.

Figure 1:
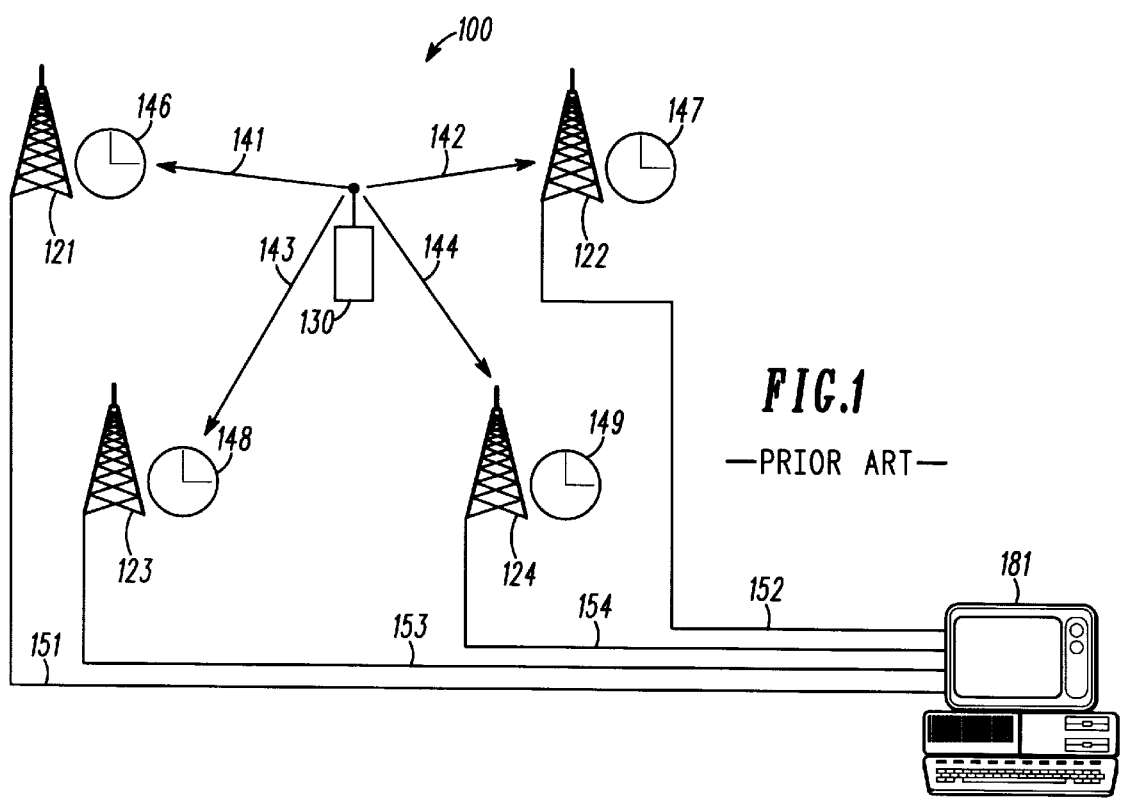
FIG. 1 illustrates an exemplary prior art, ground-based inbound RTOA system.

In inbound system 200 there are included a plurality of free receivers 221–223 and a common reference receiver 224 coupled to receive a timing signal broadcast from a transmitter device 230, which signal travels over direct RF paths 241–244 to each of the receivers 221–224, respectively. As explained in connection with prior art system 100 depicted in FIG. 1, the transmitter may be any mobile or portable device capable of transmitting a signal detectable by receivers 221–224. Each free receiver 221–223 is coupled by way of an associated RF link 251–253 to common reference receiver 224. Reference receiver 224 scans the RF links 251–253 for associated signal-received indications from each of free receivers 221–223. Each signal-received indication is timestamped using the common receiver's independently-running clock 260. Clock 260 may be an atomic (cesium timebase) clock, an oven-controlled oscillator type clock, or the like high-precision timebase source. In the illustrative embodiment, free receivers 221–223, which may be base station receivers or repeaters, are not provided with high-precision clocks, as was the case for receivers 121–123 in prior art system 100.

Inbound system 200 obviates the need for independently-running clocks in each of free receivers 221–223, thus eliminating the need to also synchronize such clocks. As will be explained in greater detail below, each receiver 221–223 reports arrival information, in the form of a signal-received indication, directly over RF links 241–243, to common receiver 224, which does have a clock and does timestamp the separately received signal-received indication from each free receiver.

Accordingly, rather than requiring each receiver in the system to maintain a separate high-precision timebase, all free receivers (221, 222, 223) on receiving the signals 241, 242, and 243, forward them after a fixed or otherwise known time delay to the reference receiver (224). This reference receiver (224) timestamps all signals from all free receivers according to its own timebase. In this way, instead of all receiver timebases being required to maintain the specified accuracy over an entire interval between clock synchronization and calibration (generally on the order of seconds or tens of seconds in a configuration such as system 100 in FIG. 1), reference receiver (224) timebase 260 must maintain this accuracy only over the travel times and delays of the component signals (generally in the single microseconds) and the free receivers must maintain accuracy only for the duration of the specified delay. It is possible to synchronize the free receiver reports to the signal from the transmitter (230) and send them simultaneously, reducing the delay to zero.

In accordance with the illustrative embodiment, reference receiver (224) then sends all timestamps to a location console (281), which compensates for the known travel times from the free receivers 221–223 to reference receiver 224, as well as for any possible delays (actual or estimated) in the retransmission of the RF timing signal on links 241–243 from transmitter 230. Navigation console 281 includes position locating means 285 which calculates, as a function of the compensated travel times, possible delays, and reference-receiver timestamped signal arrival times for each free receiver, the location of transmitter device 230 at the time transmitter 230 send the RF timing signal. It should be appreciated that position locating means 285 may be implemented entirely in software based on well understood mathematical trilateration equations utilizing the known and calculated parameters explained above.

While the illustrative embodiment shows common reference receiver 224 as also configured to detect and timestamp the timing signal from transmitter device 230 (using reference receiver internal clock 260), this need not be the case. Furthermore, the functions of reference receiver 224 and navigation console 281 may be integrated as shown in ground-based TOA system 200' (shown in FIG. 3) configured in accordance with a second preferred embodiment of the present invention.

Figure 3:
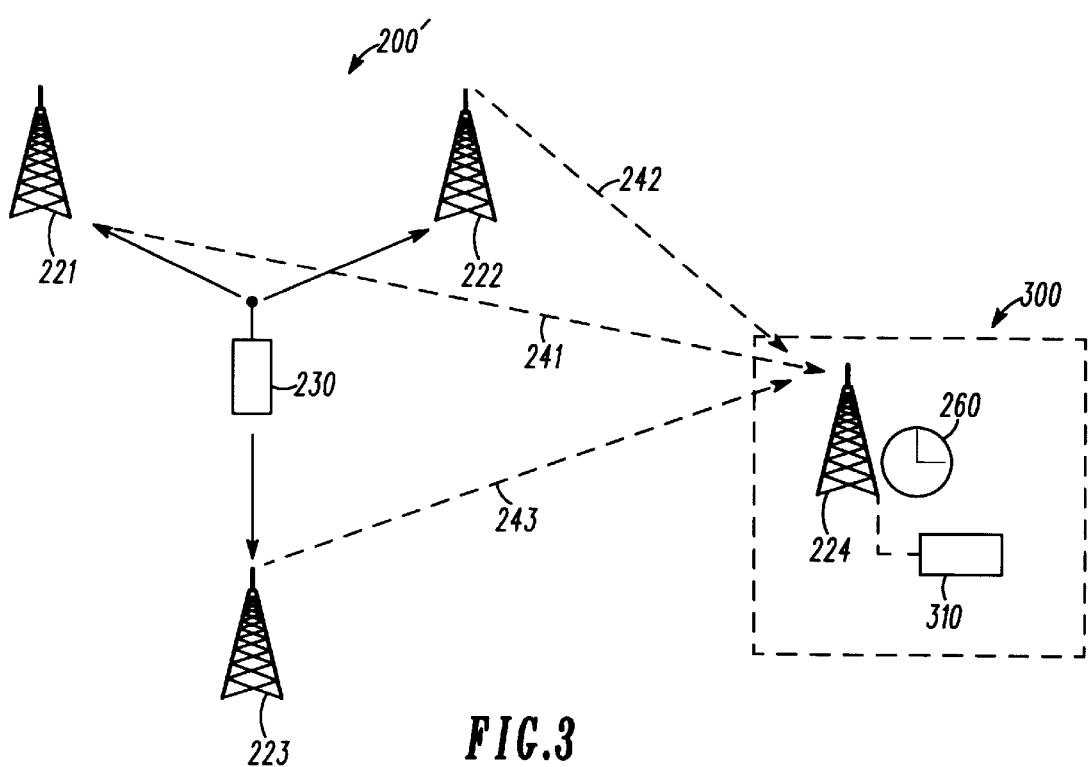
FIG. 3 illustrates an exemplary, ground-based inbound RTOA system, having receivers configured for processing and reporting time-of-arrival signals in accordance with an alternative embodiment of the present invention.

Referring to FIG. 3, reference receiver 300 includes position locating means 310 for performing position location calculations and is configured to receive signal-received indications, over RF links 241–243—but, unlike system 200, not from transmitter 230 directly. Reference receiver 300 may be attractive as a bare bones add-on component in existing communication systems where none of the receivers may be provided with high precision timebases, so as to readily and at low cost provide high-accuracy position location functionality thereto. In the implementation contemplated by FIG. 3, it is not intended that reference receiver 300 be configured to process voice/data communications, but only sufficient timing signal processing capability (i.e., capability to process signal-received indication signals) to interface with free receivers 221–223 tirelessly coupled thereto.

Figure 4:
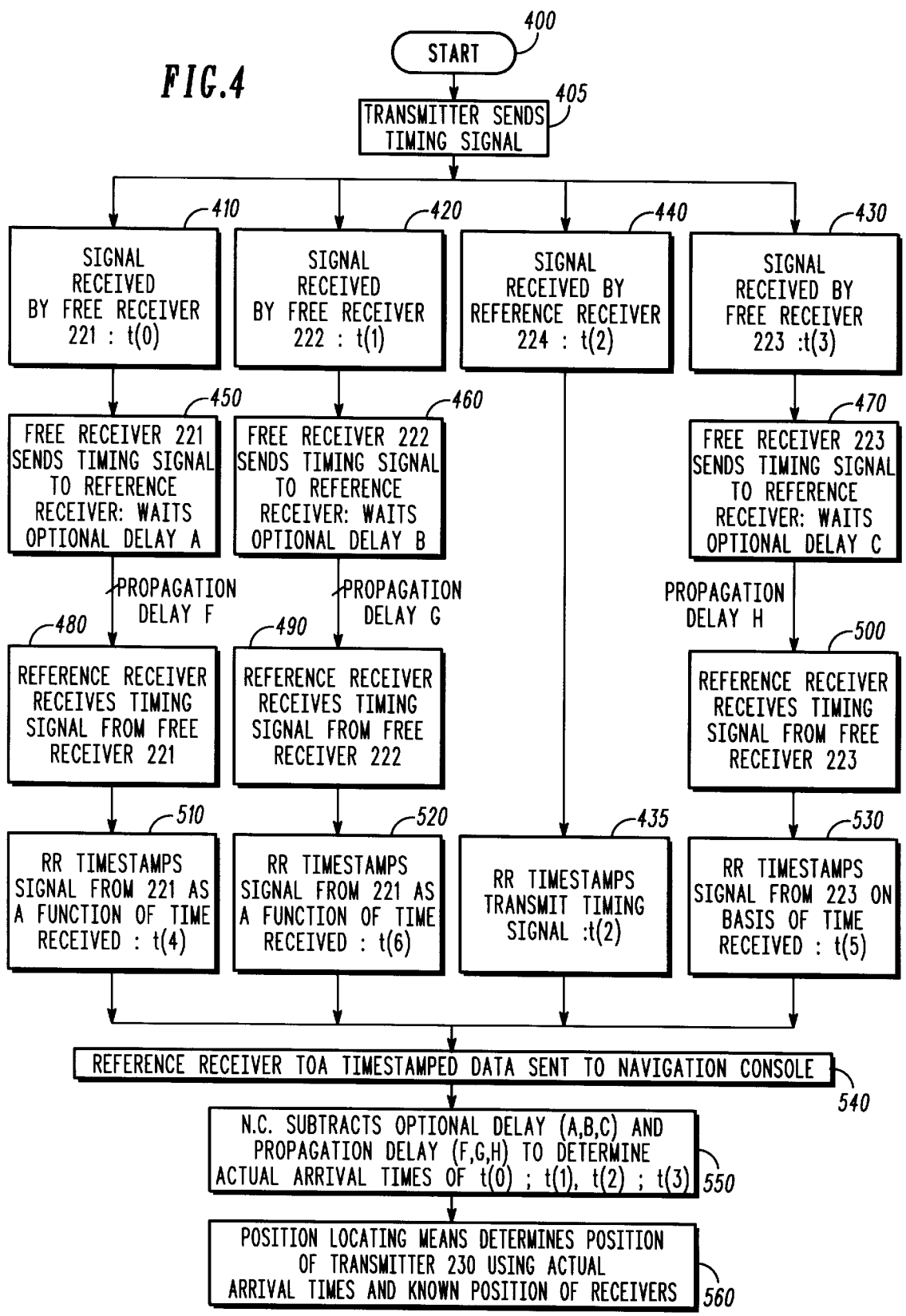
FIG. 4 illustrates a flow chart showing the operational flow of the receiver time-of-arrival signal processing and time stamping scheme in accordance with the first preferred embodiment of the present invention.
Figure 5:
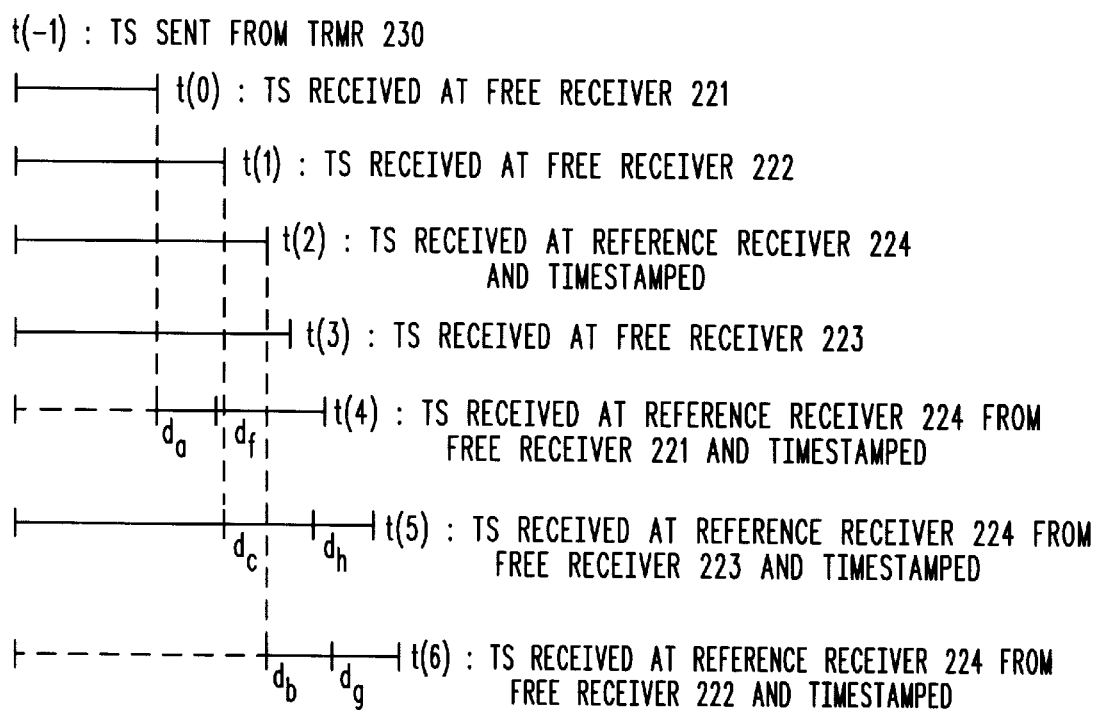
FIG. 5 illustrates a timing diagram illustrating the sequence in which receivers process and report signals received from the transmitter and from one another in accordance with the first embodiment of the present invention.

The operational flow of position location system 200 will now be described in greater detail with reference to the flow chart in FIG. 4 and the timing diagram of FIG. 5.

At time t(−1), transmitter 230 broadcasts a timing signal (405). At times t(0), t(1), t(3) and t(2), each of free receivers 221–223 and reference receiver 224 receive the timing signal (410–440). In this exemplary embodiment, the timing signal arrives at reference 224 a short while t(2) before it arrives at free receiver 223 t(3). Reference receiver 224 immediately generates a timestamp signal, using internal clock 260, to record arrival time t(3) (435). Free receiver 221 generates a non-timestamped signal-received indication type timing signal and transmits it after an optional known delay period $d_a$ (450). Similarly, free receivers 222 and 223 generate non-timestamped signal-received indications and transmit them after associated optional known delay periods $d_b$ and $d_c$ (460, 470).

Non-timestamped, signal-received signals from each of free receivers 221–223 are received by reference receiver 224 at times t(4), t(6) and t(5) respectively, which times include associated known delay periods $d_a$, $d_b$ and $d_c$ as well as known propagation delay times $d_f$, $d_g$ and $d_h$ corresponding to the travel time of those signals to reference receiver 224 (480–500). Reference receiver 224 then generates a timestamp t(4), t(6), and t(5) for each of the signal-received indications from free receivers 221–223 (510–530), and forwards the timestamp data signals to navigation console 281 (540). Console 281 subtracts the known optional delay periods $d_a$, $d_b$ and $d_c$ and the known propagation delay periods $d_f$, $d_g$ and $d_h$ from the timestamped values to arrive at the actual timing signal arrival times t(0), t(1), t(3) at each of free receiver 221–223, respectively (550).

Position locating means 285 finally then executes known trilateration calculation techniques, based on each of four values t(0)–t(3) to arrive at a highly accurate location position of transmitter 230 at the time it generated the timing signal (560).

It should be understood that once the timing signal is detected, reference receiver 224 does not need to send out a signal-received indication. Instead, it merely generates a timestamped signal which is then reported together with the timestamped signals (reports) from each of free receivers 221–223, to navigation console 281.

It should further be appreciated that in a reasonably sized implementation, it may make sense to implement several reference receivers 224. In such a scenario, it should be remembered that RTOA data is most valid between reports relative to the same reference receiver. This does not preclude, however, the same free receiver signal from being recorded at more than one reference receiver.

The primary structural difference between the prior art and the present invention is in the reporting paths. Although reporting over RF rather than over a wireline connection is not particularly novel, this invention utilizes the predictability of the RF link in order to facilitate single-clock synchronization. Remembering that the crucial geometrical element to be determined is the relationship between path lengths from a portable transmitter unit 230 to the fixed receiver sites, e.g., 261 and 264, any delay between signal arrival at free receiver 221 and reference receiver 224, consisting primarily of the turnaround time (known delay period) at 221 and the propagation delay on the path 241 from receiver 221 to 224, must be predictable or determinable to the system resolution. A wireless RF link is far superior for this purpose to a wireline connection.

This first difference implies a second, which is two-way capability in each of free receivers 221–223. Each of these must be capable not only of receiving a timing signal (generally a more complex or higher bandwidth signal than one intended only for data communications), but of generating a second timing signal in response to the first. Though this involves additional transmitting functionality at every one of free receiver 221–223, the elimination of a high precision timebase more than compensates for the cost impact of this.

Reference receiver 224 must also be able to receive and timestamp several signals from different free receivers 221–223 and, depending on system configuration, from transmitter device 230 as well. These signals may be separated by time, frequency, code, space, or any other method or combination of methods. The two-way capability of free receivers and the multi-channel capability of the reference receiver now differentiate the two functionally in the proposed invention, whereas the corresponding elements of the prior art were largely identical.

The primary advantage of the present invention is the fact that a relaxation by several orders of magnitude for timebase requirements is realized. In addition, even with considerably cheaper timebases, the system accuracy is improved because the requirements for driving a radio synthesizer are then considerably more demanding than those of the location timer.

Furthermore, the navigation software is relieved of the burdensome task of monitoring, tracking, and compensating for drifts between various receiver clocks. Because the signals are all timestamped from the same reference device, minor or no compensation is necessary.

In summary, the first, intended, and most significant result is the elimination of the high-stability timebases. The required clock accuracy in the present invention implementation is on the same order as the standard oscillators in current portable products, thus extending the reliability and environmental range of free receivers while at the same time dramatically reducing their cost.

A second advantage is the elimination of the synchronization signal, generally a time broadcast as in Loran or a mock location signal from a known location from which timing errors can be inferred. The elimination of this requirement not only offers a slight cost reduction, but also eliminates the power consumption and generated interference that such a signal inevitably requires. Further, the elimination of the need for synchronizing, tracking, and maintaining the various receiver timebases represents a reduction in system complexity at the navigation console. This again represents a reliability improvement and power savings. In bandwidth terms, bandwidth-time is saved by eliminating the need for a periodic synchronization signal, which is normally required in order to maintain the synchronization of the clocks.

Finally, an ancillary advantage is that the timing signal transmitters, more than paid for by the elimination of the timebase, also replace the wired connection to the free receivers, eliminating both the modem hardware and the line costs and simultaneously improving reliability.

It should be appreciated that while the present invention has been described in the context of an RF signaling system, the principles apply equally well to other signal types such as optical, microwave, infrared, or ultrasound.

While the present invention has been particularly shown and described with reference to particular embodiments thereof, it will be understood by those skilled in the art that various changes in form and details may be made therein without departing from the spirit and scope of the present invention.

What is claimed is:

1. In an inbound communication system including a transmitter device, at least a first and second free receivers, and a common reference receiver having a master clock, a method of identifying a position location of the transmitter device, the method comprising the steps of:

transmitting a timing signal from the transmitter device over a wireless medium;

receiving the timing signal at the first free receiver at time t(0) and transmitting a first non-timestamped, signal-received indication over a communication link with predictable delay to the common reference receiver after a first known delay-reporting period has elapsed;

receiving the timing signal at the second free receiver at time t(1) and transmitting a second non-timestamped, signal-received indication over a communication link with predictable delay to the common reference receiver after a second known delay-reporting period has lapsed; and receiving, by the common reference receiver, the first and second non-timestamped, signal-received indications and, in response thereto, generating corresponding first and second timestamped signals using the master clock as a common synchronizing timebase.

2. The method of claim 1, wherein the inbound communication system includes position locating means, the method further comprising the step of:

communicating, by the common reference receiver, the first and second timestamped signals to the position locating means; and calculating, by the position locating means, a position location of said transmitter, at the time of transmission of said timing signal, as a function of (i) said first and second timestamped signals, (ii) each of the distance between the first and second free receivers and the common reference receiver, and (iii) said first and second known delay reporting periods.

3. The method of claim 2, wherein said position locating means is a navigation console coupled via a wireline link to said common reference receiver.

4. The method of claim 3, wherein said first and second known delay reporting periods are actual delay periods.

5. The method of claim 3, wherein said first and second known delay reporting periods are estimated delay periods.

6. The method of claim 3, wherein the first and second non-timestamped, signal-received indications transmitted by each of said first and second free receivers, respectively, to said common reference receiver, are timing type signals.

7. The method of claim 3, wherein said common reference receiver is a multi-channel type receiver for receiving each of said first and second non-timestamped, signal-received indications on any one of a frequency, code, or time division multiplex manner.

8. The method of claim 7, wherein said communication system is one of a radio frequency (RF), optical, microwave, infrared, and ultrasound based communication system.

9. The method of claim 1, wherein the common reference receiver includes position locating means, the method further comprising the step of:

calculating, by the position locating means, a position location of said transmitter, at the time of transmission of said timing signal, as a function of at least (i) said first and second timestamped signals, (ii) each of the distance between the first and second free receivers and the common reference receiver, and (iii) said first and second known delay reporting periods.

10. The method of claim 9, further comprising the steps of:

receiving the timing signal, over a wireless link, at the common reference receiver and generating in response thereto a third timestamped signal; and calculating the position location as a further function of said third timestamped signal.

11. The method of claim 10, wherein said first and second known delay reporting periods are actual delay periods.

12. The method of claim 10, wherein said first and second known delay reporting periods are estimated delay periods.

13. The method of claim 10, wherein the first and second non-timestamped, signal-received indications transmitted by each of said first and second free receivers, respectively, to said common reference receiver, are timing type signals.

14. The method of claim 10, wherein said common reference receiver is a multi-channel type receiver for receiving each of said first and second non-timestamped, signal-received indications on any one of a frequency, code, or time division multiplex manner.

15. The method of claim 14, wherein said communication system is one of a radio frequency (RF), optical, microwave, infrared, and ultrasound based communication system.

16. The method of claim 1, wherein the first and second non-timestamped, signal-received indications transmitted by each of said first and second free receivers, respectively, to said common reference receiver, are timing type signals.

17. The method of claim 1, wherein said common reference receiver is a multi-channel type receiver for receiving each of said first and second non-timestamped, signal-received indications on any one of a frequency, code, or time division multiplex manner.

18. The method of claim 1, wherein said master clock is a high-precision timebase.

19. The method of claim 1, wherein said communication system is one of a radio frequency (RF), optical, microwave, infrared, and ultrasound based communication system.

20. In a communication system including a transmitter, at least a first receiver and a second receiver, and a common reference receiver having a master clock, a method of identifying a location of the transmitter, the met hod comprising the steps of.

transmitting a timing signal from the transmitter over a wireless medium;

receiving the timing signal at the first receiver at time t(0) and transmitting a first non-timestainped, signal-received indication over a communication link to the common reference receiver after a first known delay-reporting period has lapsed;

receiving the timing signal at the second receiver at time t(1) and transmitting a second non-timestamped, signal-received in dictation over a communication link to the common reference receiver after a second known delay-reporting period has lapsed; and receiving, by the common reference receiver, the first and second non-timestamped, signal-received indications and, in response thereto, generating corresponding first and second timestamped signals using the master clock as a common synchronizing timebase.

\* \* \* \* \*